United States Patent
Chien et al.

(10) Patent No.: US 11,531,261 B2
(45) Date of Patent: Dec. 20, 2022

(54) PROJECTOR WITH PREFERRED LIGHTING UNIFORMITY

(71) Applicant: QISDA CORPORATION, Taoyuan (TW)

(72) Inventors: Chih-Shiung Chien, Taoyuan (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/352,349

(22) Filed: Jun. 20, 2021

(65) Prior Publication Data
US 2022/0004092 A1    Jan. 6, 2022

(30) Foreign Application Priority Data
Jul. 2, 2020 (CN) .......................... 202010637973.1

(51) Int. Cl.
*G03B 33/12* (2006.01)
*G03B 21/20* (2006.01)
(52) U.S. Cl.
CPC .......... *G03B 33/12* (2013.01); *G03B 21/208* (2013.01); *G03B 21/2013* (2013.01); *G03B 21/2066* (2013.01)
(58) Field of Classification Search
CPC ................ G03B 33/22; G03B 21/2013; G03B 21/2066; G03B 21/208
USPC ........................................................ 353/31
See application file for complete search history.

(56) References Cited

FOREIGN PATENT DOCUMENTS

WO    WO-2004039057 A2 *    5/2004    .......... G03B 21/005

OTHER PUBLICATIONS

WO-2004039057-A2 (Year: 2022).*

* cited by examiner

*Primary Examiner* — Jerry L Brooks

(57) ABSTRACT

A projector includes a collimator lens, a, a light transmission component and a solid-state light source. Amounts of the dichroic lens and the solid-state light source are plural. The dichroic lens and the light transmission component reflect beams with specific wavelength, and allow passing of beams with other wavelength. The solid-state light source emits the beams to the corresponding dichroic lens. The projector utilizes the dichroic lens and the light transmission component to pass the beams with different base color uniformly through the first part and the second part of the collimator lens. The projector further includes a polarized lens, a reflection lens and a phase retardation unit. The phase retardation unit transforms polarization of the beams, and the polarized lens reflects some polarized beams and allows passing of other polarized beams to combine a plurality of alignment modules for providing uniform illumination.

9 Claims, 6 Drawing Sheets

PROJECTOR WITH PREFERRED LIGHTING UNIFORMITY

BACKGROUND OF THE INVENTION

1. Field of the Invention

The present invention relates to a projector, and more particularly, to a projector with preferred lighting uniformity.

2. Description of the Prior Art

The conventional laser projector utilizes the blue light laser source to provide the illumination beam. The illumination beam is transformed into an excitation beam with different color via the wavelength conversion device (such as the color wheel partly covered by phosphor powder or quantum dot material); then, the excitation beam is mixed with the illumination beam for related application. The conventional alignment module utilizes the dichroic component to reflect the illumination beam toward the color wheel via a part of the collimator lens. A portion of the color wheel made by wavelength conversion material generates the excitation beam accordingly, and the excitation beam is directly projected onto the light receiver via the collimator lens. Besides, a part of the illumination beam passes through another portion of the color wheel without wavelength conversion function and is projected onto the light receiver via the other part of the collimator lens, and then mixed with the excitation beam. In the conventional laser projector, the illumination beam and the excitation beam are difficult to well mix, and a projection picture of the conventional laser projector cannot provide preferred color uniformity.

SUMMARY OF THE INVENTION

The present invention provides a projector with preferred lighting uniformity for solving above drawbacks.

According to the claimed invention, a projector includes a collimator lens, two first dichroic lenses, a second dichroic lens, a light transmission component, two first solid-state light sources, a second solid-state light source and a third second solid-state light source. The collimator lens has a first part and a second part divided by an axle. The two first dichroic lenses respectively correspond to the first part and the second part. Each of the two first dichroic lenses is adapted to reflect a first base color beam and allow passing of a second base color beam and a third base color beam. The second dichroic lens corresponds to the first part. The second dichroic lens is adapted to reflect parts of the second base color beam and the third base color beam, and allow passing of the other parts of the second base color beam and the third base color beam. The light transmission component corresponds to the second part and the second dichroic lens, and is adapted to reflect the second base color beam and the third base color beam. The two first solid-state light sources respectively corresponds to the two first dichroic lenses, and is adapted to emit the first base color beam toward the two first dichroic lenses. The second solid-state light source is disposed on a side of the second dichroic lens different from the light transmission component, and adapted to emit the second base color beam toward the second dichroic lens. The third second solid-state light source is disposed on the other side of the second dichroic lens different from the first part, and adapted to emit the third base color beam toward the second dichroic lens.

According to the claimed invention, a projector includes a collimator lens, a first dichroic lens, a second dichroic lens, a third dichroic lens, a light transmission component, a first solid-state light source, a second solid-state light source and a third solid-state light source. The collimator lens has a first part and a second part divided by an axle. The first dichroic lens corresponds to the first part, and is adapted to reflect a part of a first base color beam and allow the other part of the first base color beam to pass, and further allow passing of a second base color beam and a third base color beam. The second dichroic lens corresponds to the second part and the first dichroic lens, and is adapted to reflect the first base color beam and allow passing of the second base color beam and the third base color beam. The third dichroic lens is disposed on a side of the first dichroic lens different from the collimator lens and corresponds to the first part, and is adapted to reflect parts of the second base color beam and the third base color beam, and allow the other parts of the second base color beam and the third base color beam to pass. The light transmission component corresponds to the second dichroic lens and the third dichroic lens, and is adapted to reflect the second base color beam and the third base color beam. The first solid-state light source is adapted to emit the first base color beam toward the first dichroic lens. The second solid-state light source is disposed on a side of the third dichroic lens different from the light transmission component, and adapted to emit the second base color beam toward the third dichroic lens. The third solid-state light source is disposed on the other side of the third dichroic lens different from the first dichroic lens, and adapted to emit the third base color beam toward the third dichroic lens.

According to the claimed invention, a projector includes a collimator lens, a first illumination module, a second illumination module, an alignment module, a first polarization lens, a first phase retarder, a first reflector and a second polarization lens. The collimator lens has a first part and a second part divided by an axle. The first illumination module corresponds to the first part, and is adapted to emit a first illumination beam with a first polarized state. The second illumination module corresponds to the second part, and is adapted to emit a second illumination beam with the first polarized state. The alignment module is adapted to mix the first illumination beam with the second illumination beam. The alignment module includes a first polarization lens, a first phase retarder, a first reflector and a second polarization lens. The first polarization lens is disposed between the first illumination module and the first part of the collimator lens, and adapted to reflect a first polarized beam and allow passing of a second polarized beam. The first phase retarder is disposed between the first illumination module and the first polarization lens, and adapted to transform the first illumination beam into a second polarized state for projecting onto the first polarization lens. The first reflector corresponds to the second part. The second polarization lens is adapted to reflect the first polarized beam and allow passing of the second polarized beam, and the second illumination beam is reflected toward the first reflector via the second polarization lens.

According to the claimed invention, the projector further includes a third illumination module adapted to emit a third illumination beam with the first polarized state, and the alignment module further includes a second reflector corresponding to the first polarization lens and adapted to reflect the third illumination beam toward the first polarization lens.

According to the claimed invention, the projector further includes a fourth illumination module adapted to emit a fourth illumination beam with the first polarized state. The alignment module further includes a second phase retarder and a third reflector. The second phase retarder corresponds to the fourth illumination module and is adapted to transform the fourth illumination beam into the second polarized state. The third reflector corresponds to the second phase retarder, and is adapted to reflect the fourth illumination beam with the second polarized state toward the second polarization lens.

The present invention can freely adjust the number of the solid-state light sources in accordance with an illumination demand of the projector. The alignment module can set the polarization lens, the reflector and the phase retarder at suitable positions relevant to each illumination module, so as to transform the polarized state of the illumination beam emitted by the illumination modules optionally; or the alignment module may change a rate of light reflecting to light passing in the dichroic lenses, and the illumination beams with different polarized states can be mixed to provide the illumination light source with symmetric intensity or asymmetric intensity. The phase retarder can be one half wave plate or a combination of two quarter wave plates, and any optical component and a related assembly capable of transforming the polarized state of the beam can belong to a design scope of the present invention. The present invention can adjust a number of the illumination module and arrangement of the alignment module in the projector to prevent a projection image of the projector from uneven intensity due to unexpected mechanical error, and the projector of the present invention can provide the projection image having the uniform intensity and color distribution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
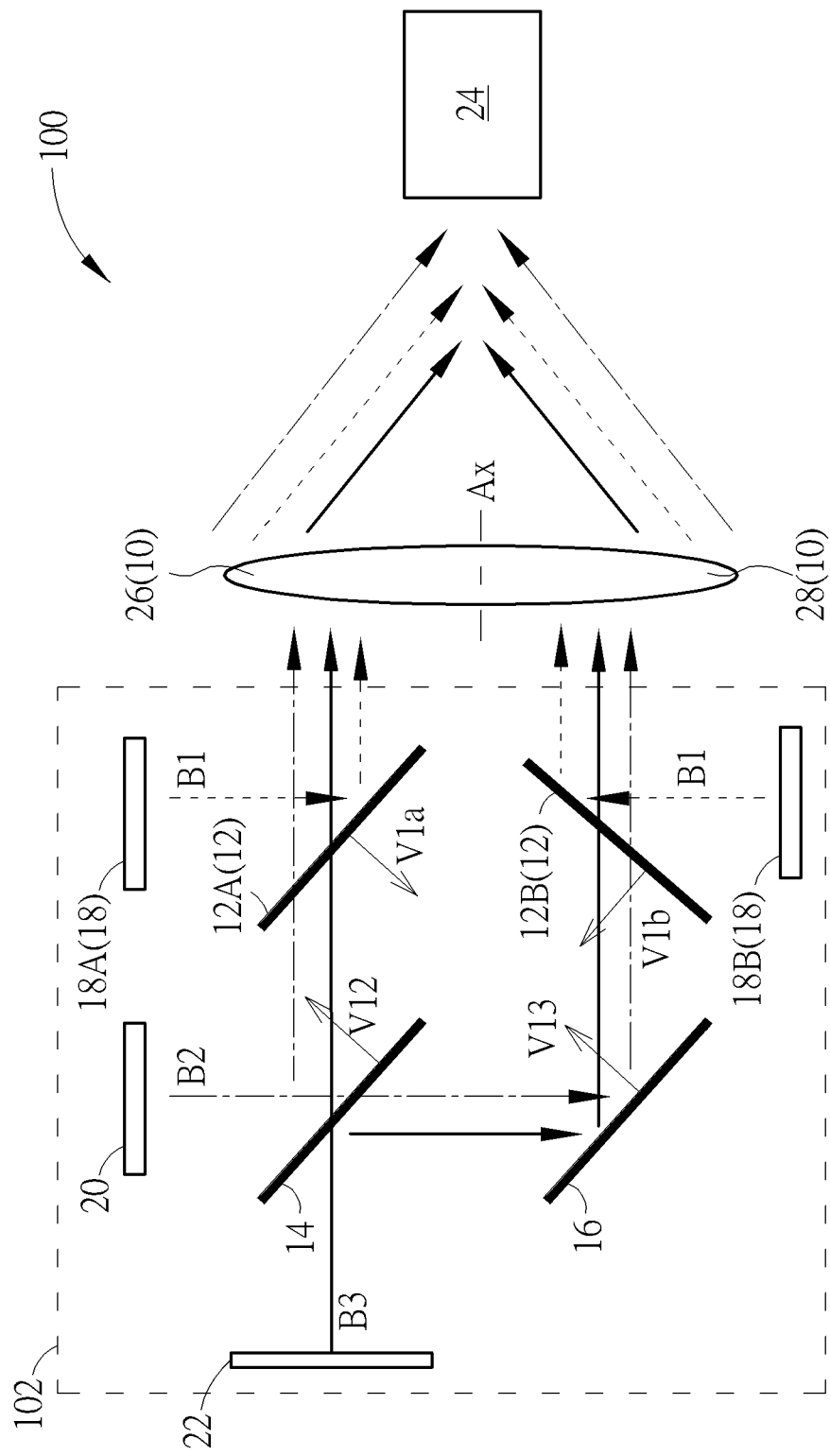
FIG. 1 is a diagram of a projector according to a first embodiment of the present invention.

Please refer to FIG. 1. FIG. 1 is a diagram of a projector 100 according to a first embodiment of the present invention. The projector 100 can include a collimator lens 10, a first dichroic lens 12, a second dichroic lens 14, a light transmission component 16, a first solid-state light source 18, a second solid-state light source 20, a third second solid-state light source 22 and an optical receiver 24. The collimator lens 10 can include a first part 26 and a second part 28 divided by an axle Ax. The projector 100 in the first embodiment may include two first dichroic lenses 12, such as the first dichroic lens 12A and the first dichroic lens 12B respectively corresponding to the first part 26 and the second part 28 of the collimator lens 10. The second dichroic lens 14 can correspond to the first part 26 of the collimator lens 10, and the first dichroic lens 12A can be located between the second dichroic lens 14 and the collimator lens 10. The light transmission component 16 can correspond to the second part 28 of the collimator lens 10 and the second dichroic lens 14. The first dichroic lens 12B can be located between the light transmission component 16 and the collimator lens 10.

The projector 100 in the first embodiment may include two first solid-state light sources 18, such as the first solid-state light source 18A and the first solid-state light source 18B respectively corresponding to the first dichroic lens 12A and the first dichroic lens 12B. The second solid-state light source 20 can be disposed on a side of the second dichroic lens 14 different from the light transmission component 16. The third second solid-state light source 22 can be disposed on the other side of the second dichroic lens 14 different from the first part 26 of the collimator lens 10; that is to say, the collimator lens 10 can be set on the right side of the second dichroic lens 14, and the second solid-state light source 20 can be set on the upper side of the second dichroic lens 14, and the light transmission component 16 can be set on the lower side of the second dichroic lens 14, and the third solid-state light source 22 can be set on the left side of the second dichroic lens 14. Besides, the optical receiver 24 can correspond to the collimator lens 10.

The first solid-state light source 18A can emit a first color beam B1 toward the first dichroic lens 12A. The first base color beam B1 can be reflected by the first dichroic lens 12A to pass through the first part 26 of the collimator lens 10. The first solid-state light source 18B can emit the first base color beam B1 toward first dichroic lens 12B. The first base color beam B1 can be reflected by the first dichroic lens 12B to pass through the second part 28 of the collimator lens 10. The second solid-state light source 20 and the third second solid-state light source 22 can respectively emit a second base color beam B2 and a third base color beam B3 toward the second dichroic lens 14. The second dichroic lens 14 can reflect parts of the second base color beam B2 and the third base color beam B3, and allow the other parts of the second base color beam B2 and the third base color beam B3 to pass.

The second base color beam B2 reflected by the second dichroic lens 14 can pass through the first dichroic lens 12A toward the first part 26 of the collimator lens 10. The second base color beam B2 passing through the second dichroic lens 14 can be projected onto the light transmission component 16, and the second base color beam B2 reflected by the light transmission component 16 can pass through the first dichroic lens 12B and arrive the second part 28 of the collimator lens 10. The third base color beam B3 passing through the second dichroic lens 14 can pass through the first dichroic lens 12A to arrive the first part 26 of the collimator lens 10. The third base color beam B3 reflected by the second dichroic lens 14 can be projected onto the light transmission component 16, and the third base color beam B3 reflected by the light transmission component 16 can pass through the first dichroic lens 12B and arrive the second part 28 of the collimator lens 10. Final, the optical receiver 24 can receive and homogenize the first base color beam B1, the second base color beam B2 and the third base color beam B3 which pass through the collimator lens 10.

In the first embodiment, a planar normal vector V1a of the first dichroic lens 12A preferably can be perpendicular to a planar normal vector V1b of the first dichroic lens 12B; the first embodiment may further define that an included angle between the planar normal vector V1a and the planar normal vector V1b can be within a predefined angle range, such as the range between eighty-five degrees and ninety-five degrees. Besides, a planar normal vector V12 of the second dichroic lens 14 preferably can be parallel to a planar normal vector V13 of the light transmission component 16; the first embodiment may further define that an included angle between the planar normal vector V12 and the planar normal vector V13 can be within another predefined angle range, such as the range between positive five degrees and negative five degrees. Ranges of the included angle relevant to the planar normal vector of the present invention are not limited to the above-mentioned embodiments, and depend on a design demand.

The projector 100 does not set the solid-state light source on position corresponding to the light transmission component 16 due to a property of the second dichroic lens 14 capable of reflecting parts of the second base color beam B2 and the third base color beam B3 and allowing the other parts of the second base color beam B2 and the third base color beam B3 to pass, so as to decrease a number of elements in the alignment module 102 for economizing manufacturing cost of the projector 100. Generally, the first base color beam B1 can be red light, the second base color beam B2 can be green light and third base color beam B3 can be blue light. The first dichroic lens 12A and the first dichroic lens 12B can guide the first base color beam B1, the second base color beam B2 and third base color beam B3 respectively into the first part 26 and the second part 28 of the collimator lens 10 to form two illumination beams. The optical receiver 24 can receive the illumination beams with symmetric intensity, such as intensity in vertical symmetry or in transverse symmetry, which depends on an arrangement angle of the optical receiver 24.

Figure 2:
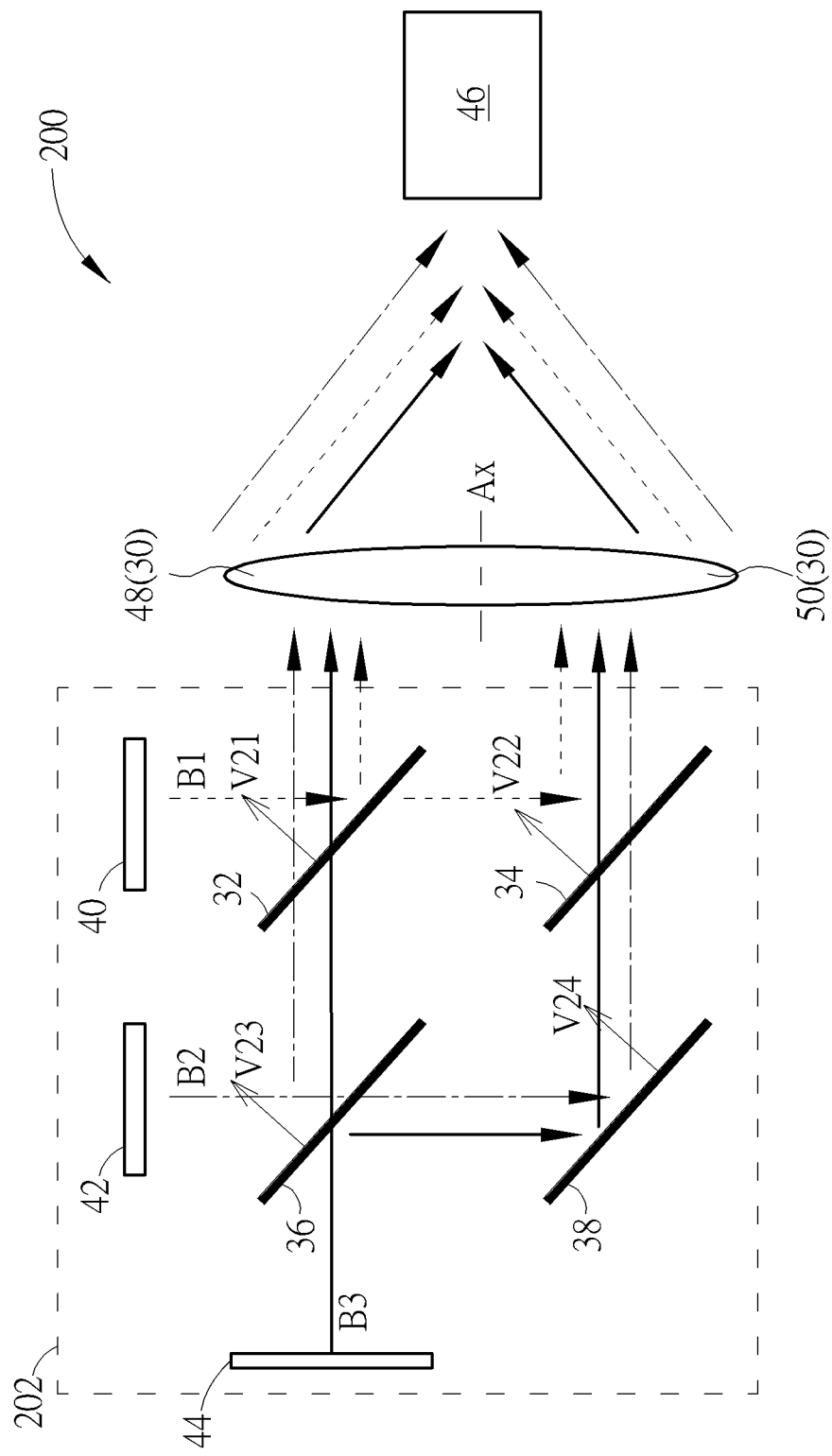
FIG. 2 is a diagram of a projector according to a second embodiment of the present invention.

Please refer to FIG. 2. FIG. 2 is a diagram of a projector 200 according to a second embodiment of the present invention. The projector 200 can include a collimator lens 30, a first dichroic lens 32, a second dichroic lens 34, a third dichroic lens 36, a light transmission component 38, a first solid-state light source 40, a second solid-state light source 42, a third second solid-state light source 44 and an optical receiver 46. The collimator lens 30 can include a first part 48 and a second part 50 divided by the axle Ax. The first dichroic lens 32 can correspond to the first part 48 of the collimator lens 30. The second dichroic lens 34 can correspond to the first dichroic lens 32 and the second part 50 of the collimator lens 30. The third dichroic lens 36 can be disposed on a side of the first dichroic lens 32 different from the collimator lens 30, and further correspond to the first part 48 of the collimator lens 30. The light transmission component 38 can correspond to the second dichroic lens 34 and the third dichroic lens 36.

The first solid-state light source 40 can correspond to the first dichroic lens 32, and emit the first base color beam B1 toward the first dichroic lens 32. The first dichroic lens 32 can reflect a part of the first base color beam B1 and allow the other part of the first base color beam B1 to pass. The second dichroic lens 34 can reflect the first base color beam B1, so that the first base color beam B1 reflected by the first dichroic lens 32 can pass through the first part 48 of the collimator lens 30, and the first base color beam B1 passing through the first dichroic lens 32 can be projected onto the second dichroic lens 34 and then the first base color beam B1 can be reflected by the second dichroic lens 34 to pass through the second part 50 of the collimator lens 30.

The second solid-state light source 42 can be disposed on a side of the third dichroic lens 36 different from the light transmission component 38. The third second solid-state light source 44 can be disposed on the other side of the third dichroic lens 36 different from the first dichroic lens 32; that is to say, the first dichroic lens 32 can be set on the right side of the third dichroic lens 36, and the second solid-state light source 42 can be set on the upper side of the third dichroic lens 36, and the third solid-state light source 44 can be set on the left side of the third dichroic lens 36, and the light transmission component 38 can be set on the lower side of the third dichroic lens 36.

The second solid-state light source 42 can emit the second base color beam B2 toward a side of the third dichroic lens 36, and the third second solid-state light source 44 can emit the third base color beam B3 toward the other side of the third dichroic lens 36. The first dichroic lens 32 and the second dichroic lens 34 can allow passing of the second base color beam B2 and the third base color beam B3. The third dichroic lens 36 can reflect parts of the second base color beam B2 and the third base color beam B3, and allow the other parts of the second base color beam B2 and the third base color beam B to pass. The light transmission component 38 can directly reflect the second base color beam B2 and the third base color beam B3. Therefore, the second base color beam B2 reflected by the third dichroic lens 36 can pass through the first dichroic lens 32 and then through the first part 48 of the collimator lens 30; the second base color beam B2 passing through the third dichroic lens 36 can be reflected by the light transmission component 38, and pass through the second dichroic lens 34 and then through the second part 50 of the collimator lens 30. The third base color beam B3 passing through the third dichroic lens 36 can pass through the first dichroic lens 32 and then through the first part 48 of the collimator lens 30; the third base color beam B3 reflected by the third dichroic lens 36 can be projected onto the light transmission component 38, and be reflected by the light transmission component 38 to pass through the second dichroic lens 34 and then through the second part 50 of the collimator lens 30.

The optical receiver 46 can correspond to the collimator lens 30, and used to receive and homogenize the first base color beam B1, the second base color beam B2 and the third base color beam B3 which pass through the collimator lens 30. In the second embodiment, a planar normal vector V21 of the first dichroic lens 32 preferably can be parallel to a planar normal vector V22 of the second dichroic lens 34, or the second embodiment may define that an included angle between the planar normal vector V21 and the planar normal vector V22 can be set within the predefined angle range. In addition, a planar normal vector V23 of the third dichroic lens 36 preferably can be parallel to a planar normal vector V24 of the light transmission component 38, or the second embodiment may define that an included angle between the planar normal vector V23 and the planar normal vector V24 can be set within the predefined angle range. The foresaid predefined angle range can be ranged between the positive five degrees and the negative five degrees, which depends on the actual demand.

Comparing to the first embodiment, the projector 200 of the second embodiment can rotate the second dichroic lens 34 to adjust its orientation for omitting one solid-state light source corresponding to the second dichroic lens 34 due to a property of the first dichroic lens 32 capable of reflecting a part of the first base color beam B1 and allowing the other part of the first base color beam B1 to pass and further allowing passing of the second base color beam B2 and the third base color beam B3. A number of components in the alignment module 202 can be decreased to economize inner space and manufacturing cost of the projector 200.

Figure 3:
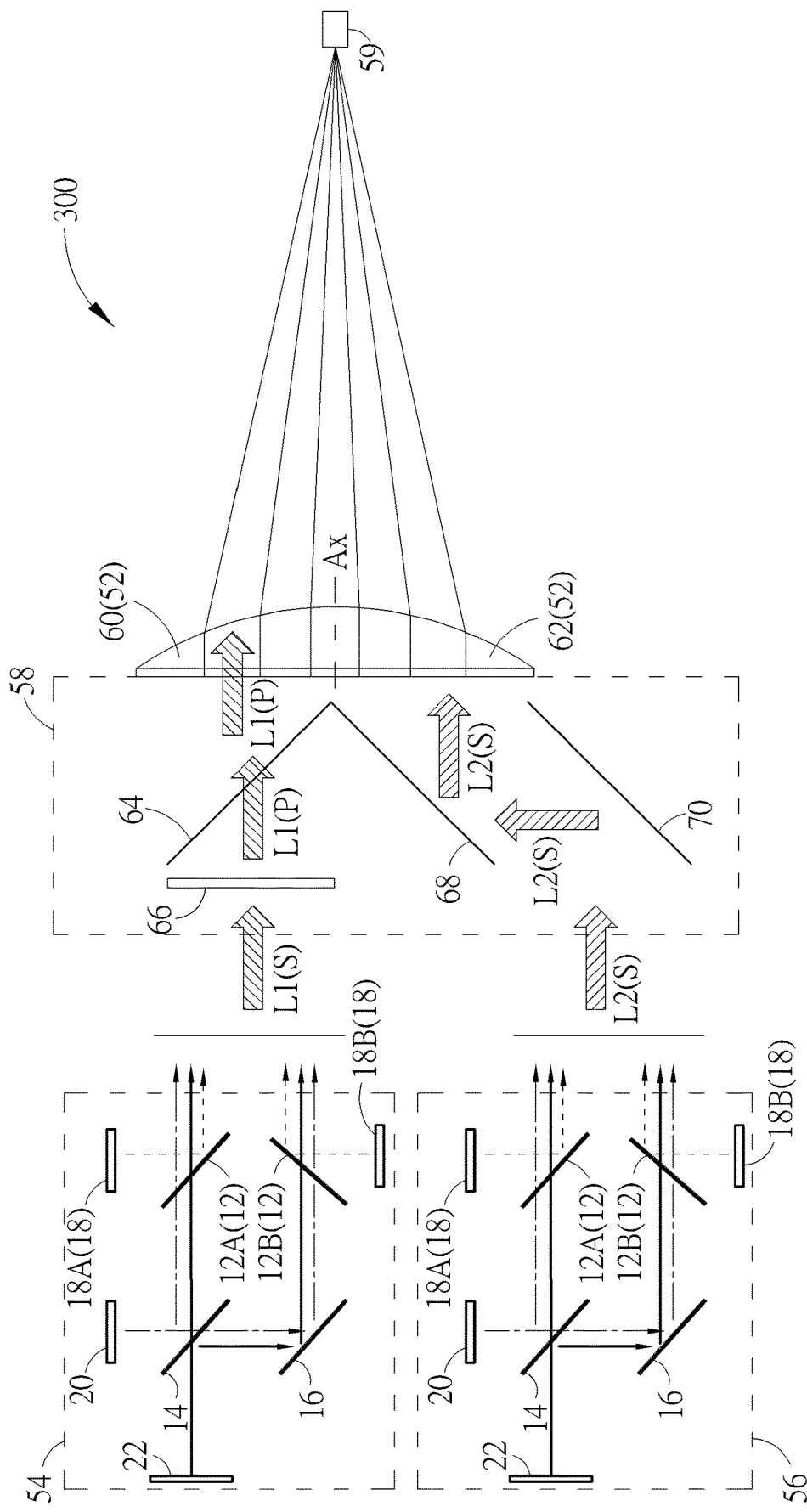
FIG. 3 is a diagram of a projector according to a third embodiment of the present invention.

Please refer to FIG. 3. FIG. 3 is a diagram of a projector 300 according to a third embodiment of the present invention. The projector 300 can include a collimator lens 52, a first illumination module 54, a second illumination module 56 and an alignment module 58. The collimator lens 52 can include a first part 60 and a second part 62 divided by the axle Ax. The first illumination module 54 can correspond to the first part 60 of the collimator lens 52, and emit a first illumination beam L1 with a first polarized state S. The second illumination module 56 can correspond to the second part 62 of the collimator lens 52, and emit a second illumination beam L2 with the first polarized state S. In the third embodiment, the first illumination module 54 and the second illumination module 56 an be the alignment module 102 shown in FIG. 1, or the alignment module 202 shown in FIG. 2, or any other alignment module with similar functions. Application of the illumination module is not limited to the above-mentioned embodiments, and depends on the actual demand.

The alignment module 58 can mix the first illumination beam L1 with the second illumination beam L2. The alignment module 58 can include a first polarization lens 64, a first phase retarder 66, a first reflector 68 and a second polarization lens 70. The first polarization lens 64 can be disposed between the first illumination module 54 and the first part 60 of the collimator lens 52. The first polarization lens 64 can reflect the beam with the first polarized state S, and allow passing of the beam with a second polarized state P. The first phase retarder 66 can be disposed between the first illumination module 54 and the first polarization lens 64. The first reflector 68 can correspond to the second part 62 of the collimator lens 52. The second polarization lens 70 can correspond to the second illumination module 56 and the first reflector 68. The second polarization lens 70 can reflect the beam with the first polarized state S, and allow passing of the beam with the second polarized state P.

In the third embodiment, the first illumination module 54 can emit the first illumination beam L1 with the first polarized state S toward the first phase retarder 66, and the first phase retarder 66 can transform the first illumination beam L1 into the second polarized state P and project toward the first polarization lens 64; the first illumination beam L1 with the second polarized state P can pass through the first polarization lens 64 and then through the first part 60 of the collimator lens 52. Further, the second illumination module 56 can emit the second illumination beam L2 with the first polarized state S toward the second polarization lens 70, and the second polarization lens 70 can reflect the second illumination beam L2 toward the first reflector 68, and the first reflector 68 can reflect the second illumination beam L2 with the first polarized state S to pass through the second part 62 of the collimator lens 52. The optical receiver 59 can correspond to the collimator lens 52, and receive and homogenize the first illumination beam L1 with the second polarized state P and the second illumination beam L2 with the first polarized state S.

The first illumination module 54 and the second illumination module 56 of the projector 300 can emit the illumination beams L1(S) and L2(S) with the same polarized state. The present invention can utilize the first phase retarder 66 to transform the polarized state of the first illumination beam L1, and then utilize the first polarization lens 64 to guide the first illumination beam L1 with the second polarized state P into the first part 60 of the collimator lens 52, and further utilize reflection of the second polarization lens 70 and the first reflector 68 to guide the second illumination beam L2 with the first polarized state S toward the second part 62 of the collimator lens 52, so that the optical receiver 59 can receive two illumination beams L1 and L2 with the matched polarized states and the symmetric intensity, such as the intensity in vertical symmetry or in transverse symmetry, which depends on the arrangement angle of the optical receiver 59.

Figure 4:
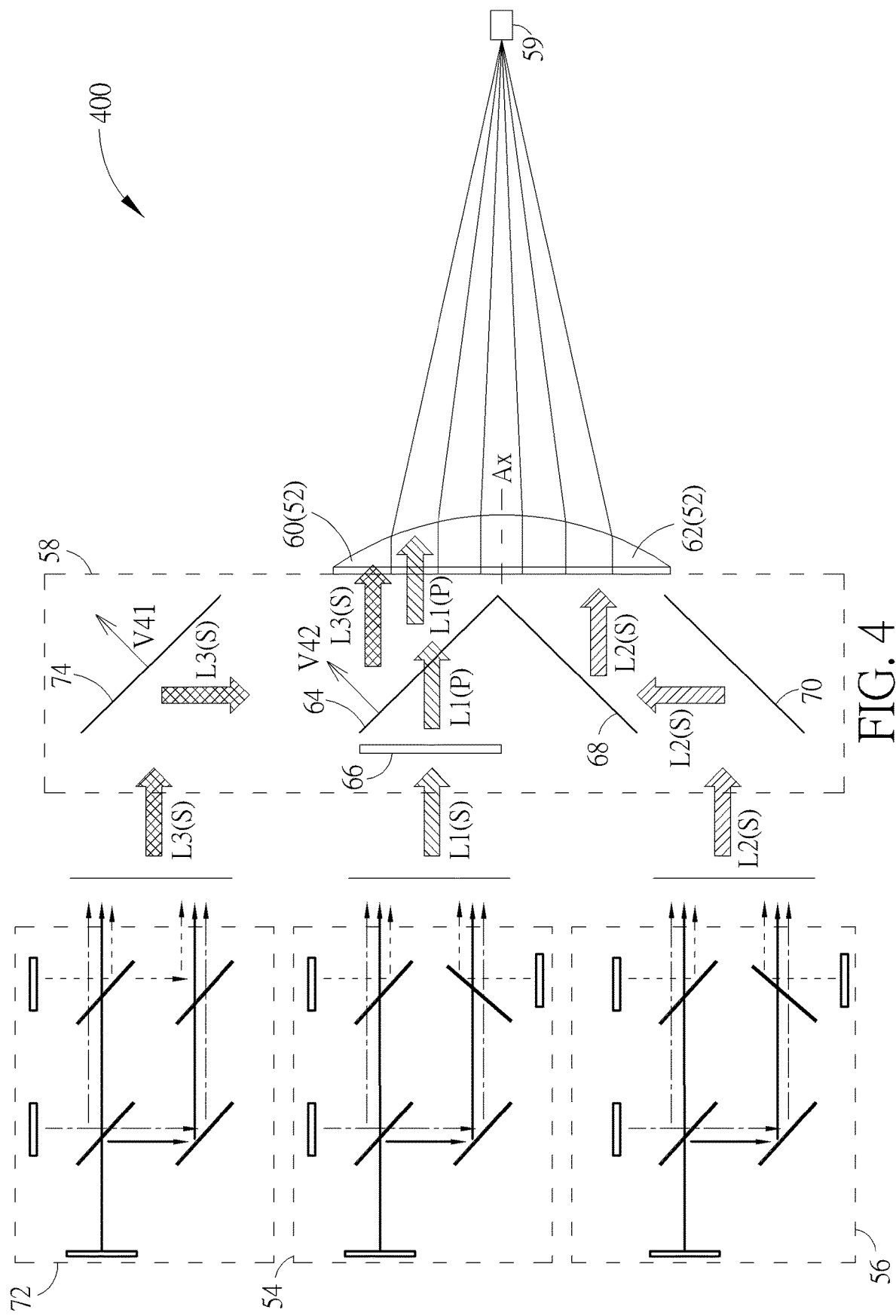
FIG. 4 is a diagram of a projector according to a fourth embodiment of the present invention.

Please refer to FIG. 4. FIG. 4 is a diagram of a projector 400 according to a fourth embodiment of the present invention. In the fourth embodiment, elements having the same numerals as ones of the above-mentioned embodiment have the same structures and functions, and a detailed description is omitted herein for simplicity. The projector 400 can include a third illumination module 72 used to emit a third illumination beam L3 with the first polarized state S. The third illumination module 72 can be the alignment module 102 shown in FIG. 1 or the alignment module 202 shown in FIG. 2, or any alignment module with similar functions. The alignment module 58 of the projector 400 can further include a second reflector 74 which can bet set corresponding to the first polarization lens 64 and the third illumination module 72. A planar normal vector V41 of the second reflector 74 preferably can be parallel to a planar normal vector V42 of the first polarization lens 64, or the fourth embodiment may define that an included angle between the planar normal vector V41 and the planar normal vector V42 can be set within the predefined angle range.

The third illumination module 72 can emit the third illumination beam L3 with the first polarized state S toward the second reflector 74, and the third illumination beam L3 can be reflected by the second reflector 74 to project onto the first polarization lens 64. The first polarization lens 64 can reflect the third illumination beam L3 to pass through the first part 60 of the collimator lens 52. Thus, as if an asymmetric illumination light source is needed, the present invention can set the third illumination module 72 adjacent to the first illumination module 54. The third illumination beam L3 emitted by the third illumination module 72 can have the polarized state identical with the polarized state of the first illumination beam L1 emitted by the first illumination module 54. However, the first illumination beam L1 can be transformed into the second polarized state P by the first phase retarder 66, so that the projector 400 can keep the third illumination beam L3 in the first polarized state S, and utilize the second reflector 74 and the first polarization lens 64 to mix the third illumination beam L3 in the first polarized state S with the first illumination beam L1 in the second polarized state P, and then the mixed beam can pass through the collimator lens 52 to mix with the second illumination beam L2.

Figure 5:
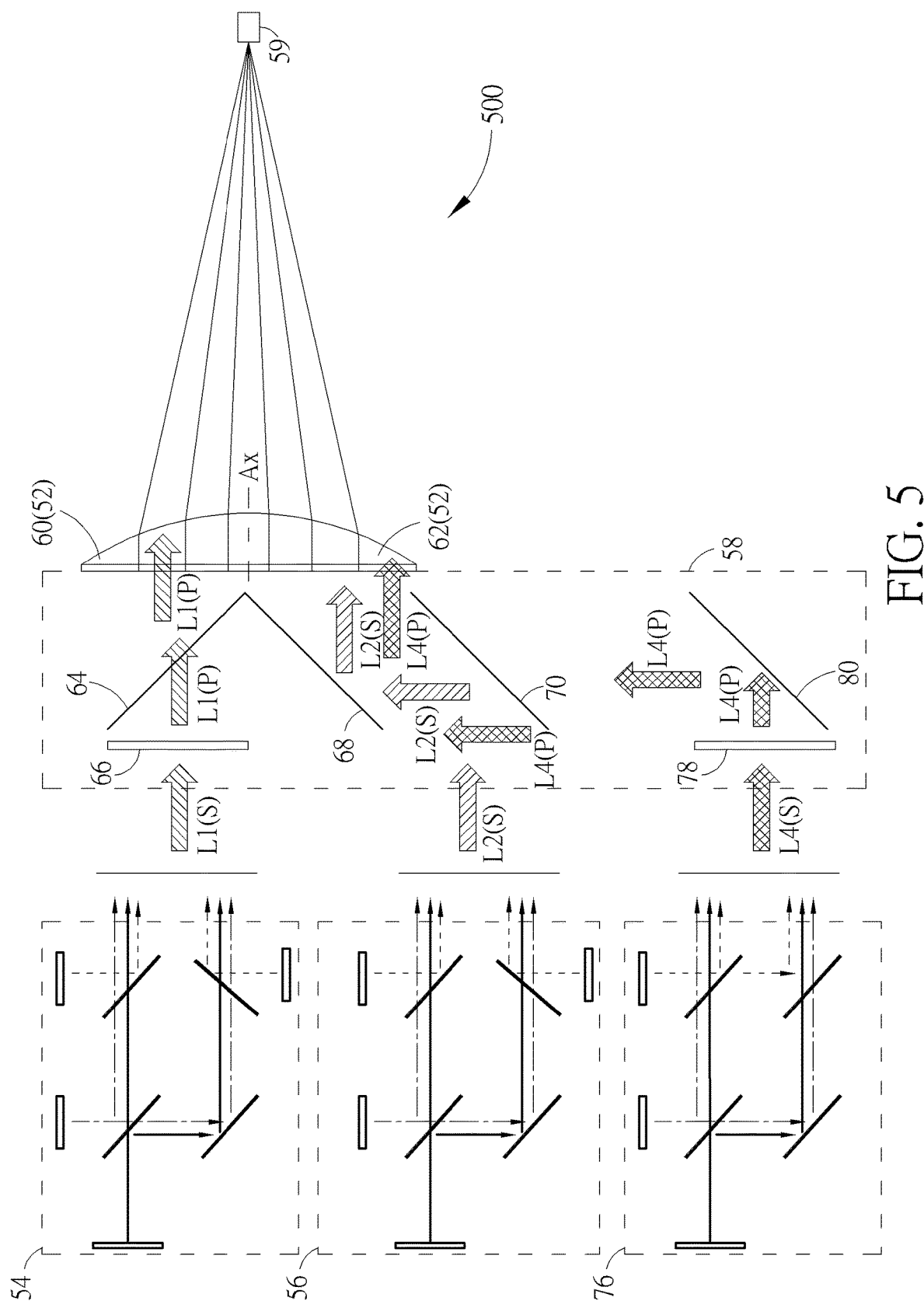
FIG. 5 is a diagram of a projector according to a fifth embodiment of the present invention.

Please refer to FIG. 5. FIG. 5 is a diagram of a projector 500 according to a fifth embodiment of the present invention. In the fifth embodiment, elements having the same numerals as ones of the above-mentioned embodiment have the same structures and functions, and a detailed description is omitted herein for simplicity. The projector 500 can further include a fourth illumination module 76 used to emit a fourth illumination beam L4 with the first polarized state S. The fourth illumination module 76 can be the alignment module 102 shown in FIG. 1, or the alignment module 202 shown in FIG. 2, or any alignment module with similar functions. The alignment module 58 of the projector 500 can further include a second phase retarder 78 and a third reflector 80. The second phase retarder 78 can correspond to the fourth illumination module 76. The third reflector 80 can correspond to the second polarization lens 70 and the second phase retarder 78. A planar normal vector V51 of the third reflector 80 preferably can be parallel to a planar normal vector V52 of the second polarization lens 70; or the fifth embodiment may define that an included angle between the planar normal vector V51 and the planar normal vector V52 can be set within the predefined angle range.

The fourth illumination module 76 can emit the fourth illumination beam L4 with the first polarized state S. The fourth illumination beam L4 with the first polarized state S can be transformed into the second polarized state P by the second phase retarder 78. The third reflector 80 can reflect the fourth illumination beam L4 with the second polarized state P toward the second polarization lens 70. The fourth illumination beam L4 can pass through the second polarization lens 70, and then be reflected by the first reflector 68 to pass through the second part 62 of the collimator lens 52. As if an illumination light source with asymmetric intensity different from the fourth embodiment is needed, the present invention can further set the fourth illumination module 76 adjacent to the second illumination module 56. The fourth illumination beam L4 emitted by the fourth illumination module 76 can have the polarized state identical with the polarized state of the second illumination beam L2 emitted by the second illumination module 56. The second illumination beam L2 can keep the polarized state and be projected onto the second part 62 of the collimator lens 52 via the first reflector 68 and the second polarization lens 70. The projector 500 can utilize the second phase retarder 78 to transform the polarized state of the fourth illumination beam L4, so that the fourth illumination beam L4 with the second polarized state P can be mixed with the second illumination beam L2 with the first polarized state S, and the mixing beam can pass through the collimator lens 52 to mix with the first illumination beam L1.

Figure 6:
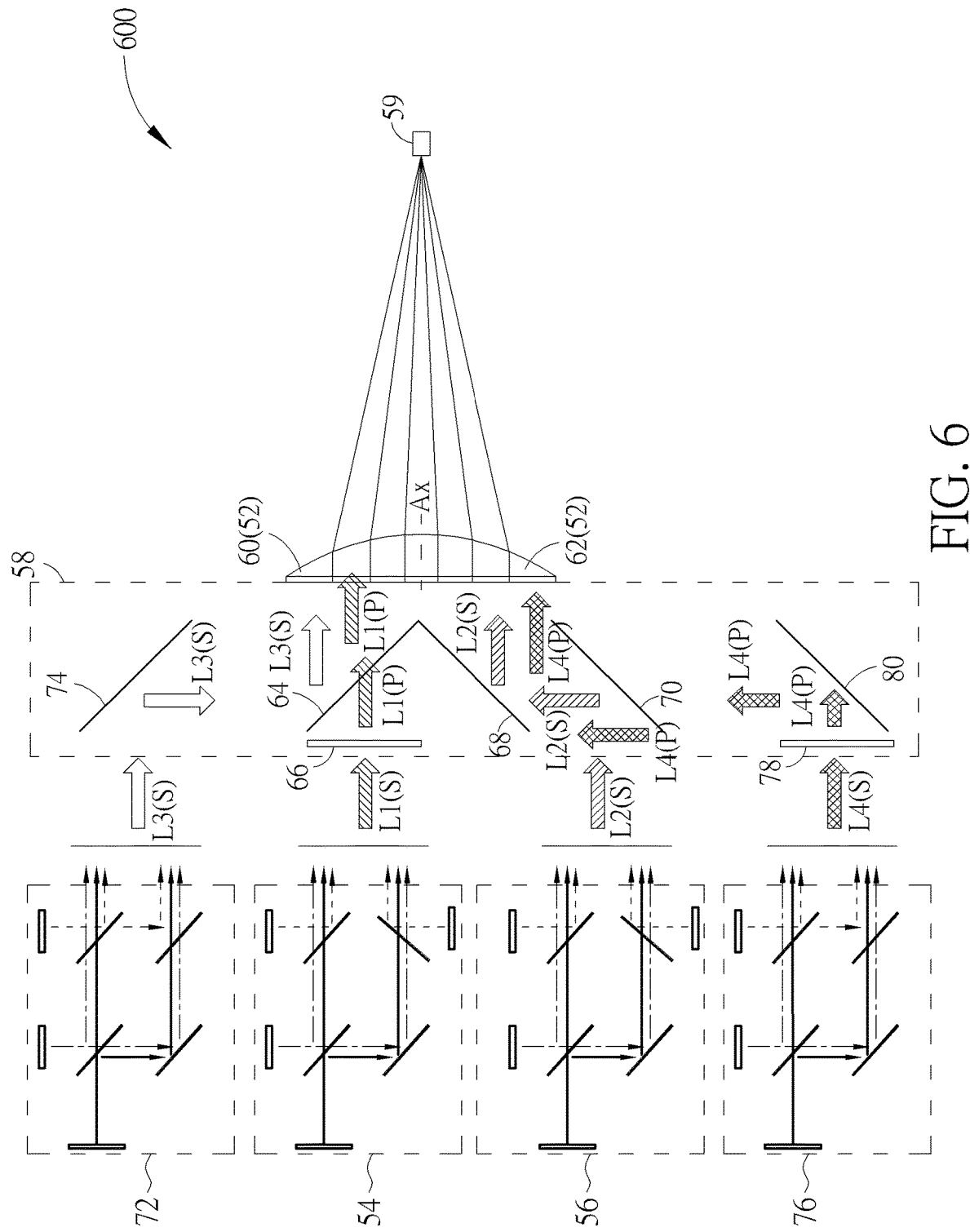
FIG. 6 is a diagram of a projector according to a sixth embodiment of the present invention.

Please refer to FIG. 6. FIG. 6 is a diagram of a projector 600 according to a sixth embodiment of the present invention. In the sixth embodiment, elements having the same numerals as ones of the above-mentioned embodiment have the same structures and functions, and a detailed description is omitted herein for simplicity. For increasing illumination intensity, the projector 600 can include at least four or more than four illumination modules. The sixth embodiment can have four illumination modules, and a number of the illumination modules can depend on the actual demand. The projector 600 can dispose the first illumination module 54, the second illumination module 56, the third illumination module 72 and the fourth illumination module 76 adjacent to each other. The collimator lens 52 can correspond to the first illumination module 54 and the second illumination module 56. The alignment module 58 can be disposed between the collimator lens 52 and the four illumination modules 54, 56, 72 and 76.

The first polarization lens 64 and the first phase retarder 66 of the alignment module 58 can be disposed between the collimator lens 52 and the first illumination module 54. The first reflector 68 and the second polarization lens 70 can be disposed between the collimator lens 52 and the second illumination module 56. The second reflector 74 of the alignment module 58 can correspond to the first polarization lens 64 and the third illumination module 72. The second phase retarder 78 and the third reflector 80 of the alignment module 58 can correspond to the second polarization lens 70 and the fourth illumination module 76. For increasing the illumination intensity, the present invention can dispose new illumination modules between the four illumination modules 54, 56, 72 and 76, or dispose new illumination modules on an outer side of the illumination module 72 and/or the illumination module 76; accordingly, the alignment module 58 may set new optical lenses to reflect the illumination beam emitted by the new illumination module or transform the polarized state of the illumination beam emitted by the new illumination module, and then mix all of the illumination beams to pass through the collimator lens 52 for alignment.

In conclusion, the present invention can freely adjust the number of the solid-state light sources in accordance with an illumination demand of the projector. The alignment module can set the polarization lens, the reflector and the phase retarder at suitable positions relevant to each illumination module, so as to transform the polarized state of the illumination beam emitted by the illumination modules optionally; or the alignment module may change a rate of light reflecting to light passing in the dichroic lenses, and the illumination beams with different polarized states can be mixed to provide the illumination light source with symmetric intensity or asymmetric intensity. The dichroic lenses can be a beam splitter or any optical component with similar functions. The light transmission component can be a reflector or a beam splitter or any optical component with similar functions. The optical receiver can be a light pipe or a light rod for collecting and guiding the beams toward other elements, or any optical component with similar functions. The polarization lens can be a beam splitter used to split beams having different polarized states, or any optical component with similar functions. The reflector can be a mirror or any optical component with similar functions. The phase retarder can be one half wave plate or a combination of two quarter wave plates, and any optical component and a related assembly capable of transforming the polarized state of the beam can belong o a design scope of the present invention. The present invention can adjust a number of the illumination module and arrangement of the alignment module in the projector to prevent a projection image of the projector from uneven intensity due to unexpected mechanical error, and the projector of the present invention can provide the projection image having the uniform intensity and color distribution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
    a collimator lens having a first part and a second part divided by an axle;
    a first illumination module corresponding to the first part, and adapted to emit a first illumination beam with a first polarized state;
    a second illumination module corresponding to the second part, and adapted to emit a second illumination beam with the first polarized state;
    an alignment module adapted to mix the first illumination beam with the second illumination beam, the alignment module comprising:
        a first reflective polarizer disposed between the first illumination module and the first part of the collimator lens, and adapted to reflect a first polarized beam and allow passing of a second polarized beam;
        a first phase retarder disposed between the first illumination module and the first reflective polarizer, and adapted to transform the first illumination beam into a second polarized state for projecting onto the first reflective polarizer;
        a first reflector corresponding to the second part; and
        a second reflective polarizer adapted to reflect the first polarized beam and allow passing of the second polarized beam, the second illumination beam being reflected toward the first reflector via the second reflective polarizer.

2. The projector of claim 1, wherein the first phase retarder is a half wave plate, or a combination of two quarter wave plates.

3. The projector of claim 1, wherein at least one of the first illumination module and the second illumination module comprises:
- two first dichroic mirrors respectively corresponding to the first part and the second part, each of the two first dichroic mirrors being adapted to reflect a first base color beam and allow passing of a second base color beam and a third base color beam;
- a second dichroic mirror corresponding to the first part, the second dichroic mirror being adapted to reflect parts of the second base color beam and the third base color beam, and allow passing of the other parts of the second base color beam and the third base color beam;
- a light transmission component corresponding to the second part and the second dichroic mirror, and adapted to reflect the second base color beam and the third base color beam;
- two first solid-state light sources respectively corresponding to the two first dichroic mirrors, and adapted to emit the first base color beam toward the two first dichroic mirrors;
- a second solid-state light source disposed on a side of the second dichroic mirror different from the light transmission component, and adapted to emit the second base color beam toward the second dichroic mirror; and
- a third second solid-state light source disposed on the other side of the second dichroic mirror different from the first part, and adapted to emit the third base color beam toward the second dichroic mirror.

4. The projector of claim 3, wherein two planar normal vectors of the two first dichroic mirrors are perpendicular to each other, or an included angle between the two planar normal vectors of the two first dichroic mirrors are within a predefined angle range.

5. The projector of claim 3, wherein one planar normal vector of the two first dichroic mirrors is parallel to a planar normal vector of the light transmission component.

6. The projector of claim 1, wherein at least one of the first illumination module and the second illumination module comprises:
- a first dichroic mirror corresponding to the first part, and adapted to reflect a part of a first base color beam and allow the other part of the first base color beam to pass, and further allow passing of a second base color beam and a third base color beam;
- a second dichroic mirror corresponding to the second part and the first dichroic mirror, and adapted to reflect the first base color beam and allow passing of the second base color beam and the third base color beam;
- a third dichroic mirror disposed on a side of the first dichroic mirror different from the collimator lens and corresponding to the first part, and adapted to reflect parts of the second base color beam and the third base color beam, and allow the other parts of the second base color beam and the third base color beam to pass;
- a light transmission component corresponding to a side of the second dichroic mirror different from the collimator lens and corresponding to the second part, and adapted to reflect the second base color beam and the third base color beam;
- a first solid-state light source adapted to emit the first base color beam toward the first dichroic mirror;
- a second solid-state light source disposed on a side of the third dichroic mirror different from the light transmission component, and adapted to emit the second base color beam toward the third dichroic mirror; and
- a third solid-state light source disposed on the other side of the third dichroic mirror different from the first dichroic mirror, and adapted to emit the third base color beam toward the third dichroic mirror.

7. The projector of claim 6, wherein a planar normal vector of the first dichroic mirror is parallel to a planar normal vector of the second dichroic mirror.

8. The projector of claim 6, wherein a planar normal vector of the third dichroic mirror is parallel to a planar normal vector of the light transmission component.

9. The projector of claim 1, further comprising:
- an optical receiver corresponding to the collimator lens, and adapted to receive and homogenize the first illumination beam and the second illumination beam.

* * * * *